United States Patent [19]
Herron et al.

[11] Patent Number: 5,938,023
[45] Date of Patent: Aug. 17, 1999

[54] TACKLE BOX

[76] Inventors: Jerry E. Herron; William L. Herron, both of 2014 Portland Ave., Louisville, Ky. 40203

[21] Appl. No.: 09/160,171

[22] Filed: Sep. 25, 1998

[51] Int. Cl.[6] .................................................. B65D 85/00
[52] U.S. Cl. ...................................... 206/315.11; 43/54.1
[58] Field of Search ........................... 206/315.1, 315.11, 206/486, 480, 483; 43/54.1, 55

[56] References Cited

U.S. PATENT DOCUMENTS

| | | | |
|---|---|---|---|
| 4,747,490 | 5/1988 | Smith | 206/315.11 |
| 5,305,544 | 4/1994 | Testa, Jr. | 206/315.11 |

*Primary Examiner*—Jacob K. Ackun

[57] ABSTRACT

A tackle box for holding fishing gear. The tackle box includes a tackle box with separable lid and base portions pivotally coupled together at the back side of the tackle box. The top of the tackle box has a carrying handle pivotally coupled thereto. The top of the tackle box has a pair of generally circular depressions each designed for receiving a bottom of a beverage container therein. The top of the tackle box also has spaced apart first and second top clips upwardly extending therefrom for holding a flashlight to the top of the tackle box. The lid and base portions of the tackle box each have a pair of side clips on the front side of the tackle box designed for holding fishing rods to the front side of the tackle box.

10 Claims, 2 Drawing Sheets

TACKLE BOX

BACKGROUND OF THE INVENTION

1. Field of the Invention

The present invention relates to tackle boxes and more particularly pertains to a new tackle box for holding fishing gear.

2. Description of the Prior Art

The use of tackle boxes is known in the prior art. More specifically, tackle boxes heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,697,379; U.S. Pat. No. 4,621,308; U.S. Pat. No. 4,353,182; U.S. Pat. No. 3,889,860; U.S. Pat. No. Des. 379,561; and U.S. Pat. No. 1,859,228.

While these devices fulfill their respective, particular objectives and requirements, the aforementioned patents do not disclose a new tackle box. The inventive device includes a tackle box with separable lid and base portions pivotally coupled together at the back side of the tackle box. The top of the tackle box has a carrying handle pivotally coupled thereto. The top of the tackle box has a pair of generally circular depressions each designed for receiving a bottom of a beverage container therein. The top of the tackle box also has spaced apart first and second top clips upwardly extending therefrom for holding a flashlight to the top of the tackle box. The lid and base portions of the tackle box each have a pair of side clips on the front side of the tackle box designed for holding fishing rods to the front side of the tackle box.

In these respects, the tackle box according to the present invention substantially departs from the conventional concepts and designs of the prior art, and in so doing provides an apparatus primarily developed for the purpose of holding fishing gear.

SUMMARY OF THE INVENTION

In view of the foregoing disadvantages inherent in the known types of tackle boxes now present in the prior art, the present invention provides a new tackle box construction wherein the same can be utilized for holding fishing gear.

The general purpose of the present invention, which will be described subsequently in greater detail, is to provide a new tackle box apparatus and method which has many of the advantages of the tackle boxes mentioned heretofore and many novel features that result in a new tackle box which is not anticipated, rendered obvious, suggested, or even implied by any of the prior art tackle boxes, either alone or in any combination thereof.

To attain this, the present invention generally comprises a tackle box with separable lid and base portions pivotally coupled together at the back side of the tackle box. The top of the tackle box has a carrying handle pivotally coupled thereto. The top of the tackle box has a pair of generally circular depressions each designed for receiving a bottom of a beverage container therein. The top of the tackle box also has spaced apart first and second top clips upwardly extending therefrom for holding a flashlight to the top of the tackle box. The lid and base portions of the tackle box each have a pair of side clips on the front side of the tackle box designed for holding fishing rods to the front side of the tackle box.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tackle box apparatus and method which has many of the advantages of the tackle boxes mentioned heretofore and many novel features that result in a new tackle box which is not anticipated, rendered obvious, suggested, or even implied by any of the prior art tackle boxes, either alone or in any combination thereof.

It is another object of the present invention to provide a new tackle box which may be easily and efficiently manufactured and marketed.

It is a further object of the present invention to provide a new tackle box which is of a durable and reliable construction.

An even further object of the present invention is to provide a new tackle box which is susceptible of a low cost of manufacture with regard to both materials and labor, and which accordingly is then susceptible of low prices of sale to the consuming public, thereby making such tackle box economically available to the buying public.

Still yet another object of the present invention is to provide a new tackle box which provides in the apparatuses and methods of the prior art some of the advantages thereof, while simultaneously overcoming some of the disadvantages normally associated therewith.

Still another object of the present invention is to provide a new tackle box for holding fishing gear.

Yet another object of the present invention is to provide a new tackle box which includes a tackle box with separable lid and base portions pivotally coupled together at the back side of the tackle box. The top of the tackle box has a carrying handle pivotally coupled thereto. The top of the tackle box has a pair of generally circular depressions each designed for receiving a bottom of a beverage container therein. The top of the tackle box also has spaced apart first and second top clips upwardly extending therefrom for holding a flashlight to the top of the tackle box. The lid and base portions of the tackle box each have a pair of side clips on the front side of the tackle box designed for holding fishing rods to the front side of the tackle box.

Still yet another object of the present invention is to provide a new tackle box that holds fishing rods and a flashlight, and lets a user rest drinks thereon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
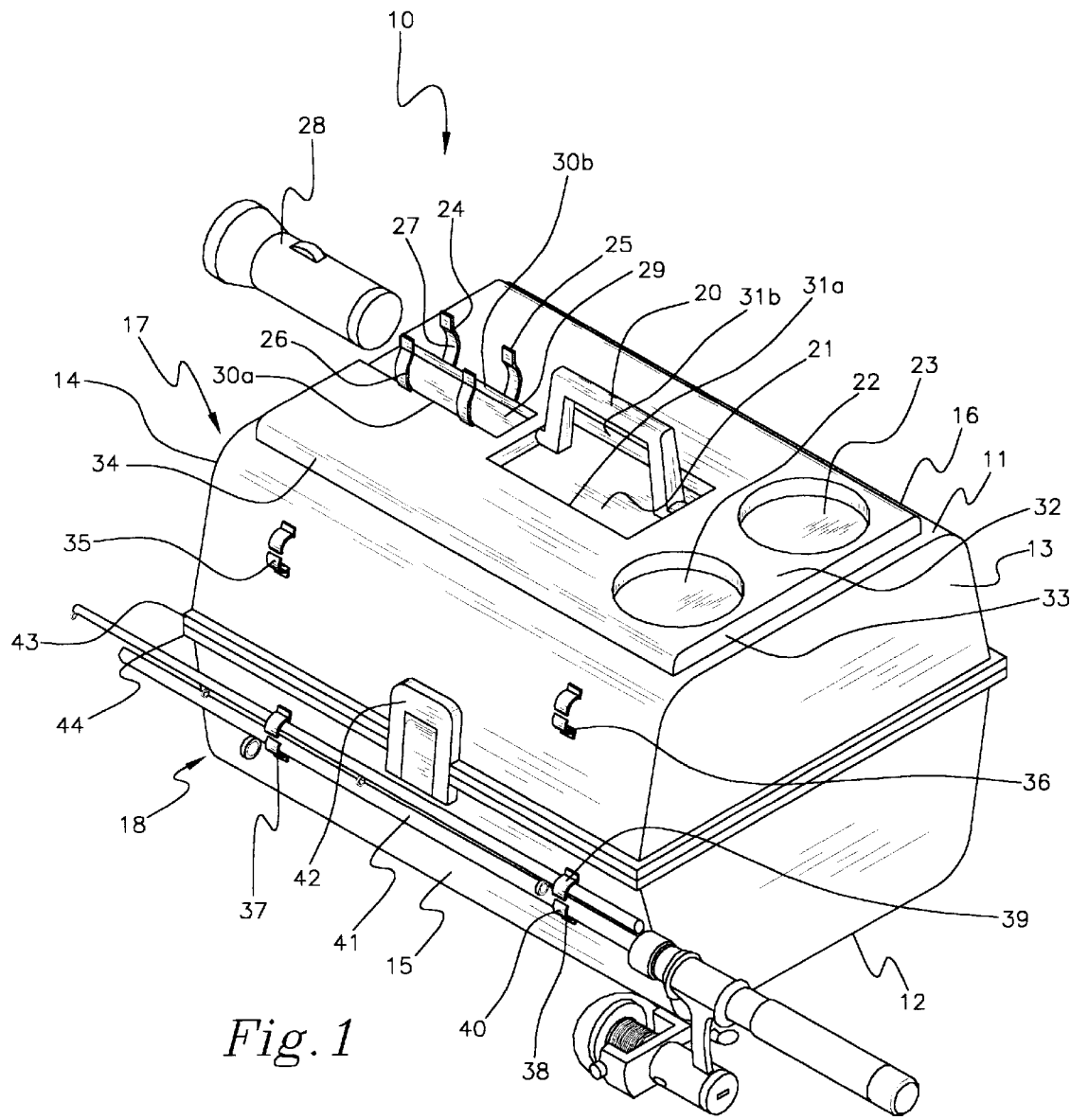
FIG. 1 is a schematic front perspective view of a new tackle box according to the present invention.
Figure 2:
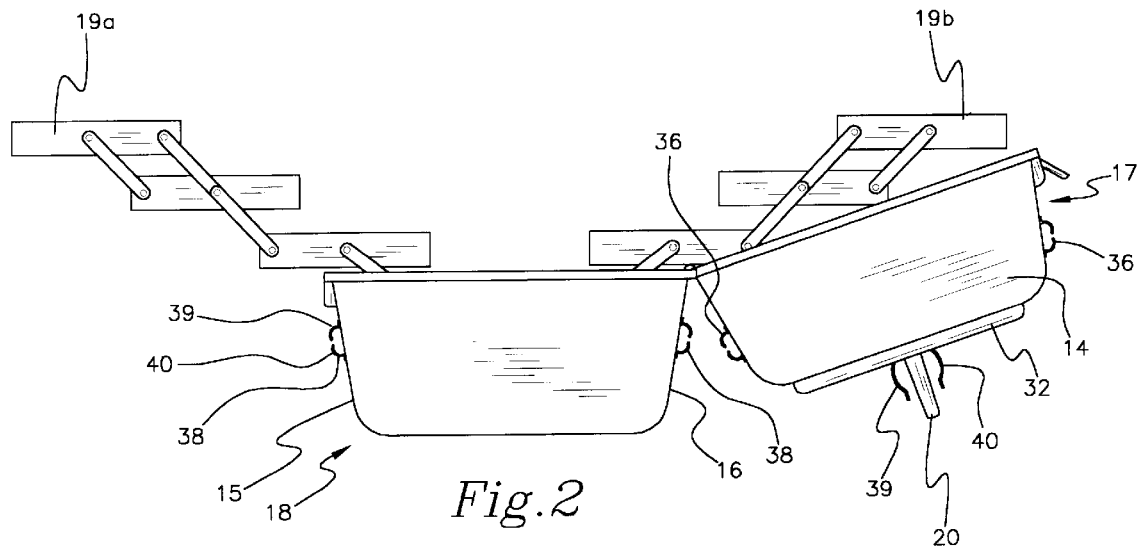
FIG. 2 is a schematic side view of the present invention with the tray assemblies in an extended deployed position.
Figure 3:
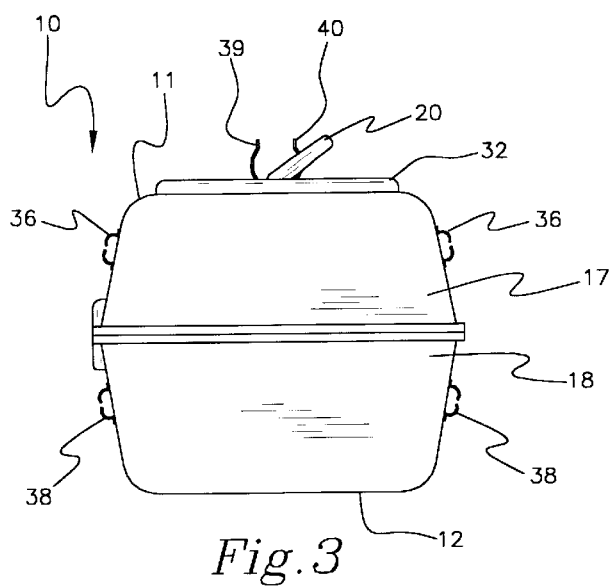
FIG. 3 is a schematic side view of the present invention with the lid portion of the tackle box closed.

With reference now to the drawings, and in particular to FIGS. 1 through 3 thereof, a new tackle box embodying the principles and concepts of the present invention and generally designated by the reference numeral 10 will be described.

As best illustrated in FIGS. 1 through 3, the tackle box 10 generally comprises a tackle box 10 with separable lid and base portions 17,18 pivotally coupled together at the back side 16 of the tackle box 10. The top 11 of the tackle box 10 has a carrying handle 20 pivotally coupled thereto. The top 11 of the tackle box 10 has a pair of generally circular depressions 22,23 each designed for receiving a bottom of a beverage container therein. The top 11 of the tackle box 10 also has spaced apart first and second top clips 24,25 upwardly extending therefrom for holding a flashlight 28 to the top 11 of the tackle box 10. The lid and base portions 17,18 of the tackle box 10 each have a pair of side clips 35,36,37,38 on the front side 15 of the tackle box 10 designed for holding fishing rods 41 to the front side 15 of the tackle box 10.

In closer detail, the tackle box 10 has a top 11, a bottom 12, first and second ends 13,14, and front and back sides 15,16. The tackle box 10 has separable lid and base portions 17,18. The lid portion 17 of the tackle box 10 includes the top 11 of the tackle box 10. The base portion 18 includes the bottom 12 of the tackle box 10. The lid and base portions 17,18 each include a portion of each of the ends 13,14 and the sides 15,16 of the tackle box 10. The lid and base portions 17,18 of the tackle box 10 are pivotally coupled together at the back side 16 of the tackle box 10. The tackle box 10 has a latch 42 on the front side 15 of the tackle box 10 releasably coupling the lid and base portions 17,18 together. Ideally, each of the portions 17,18 has an annular lip 43,44 therearound to provide a tight seal therebetween. As illustrated in FIG. 2, the tackle box 10 preferably has a pair of tray assemblies 19a,19b therein designed for holding fishing tackle and other items therein. Each of the tray assemblies 19a,19b has a plurality of trays pivotably coupled together to permit pivoting of the respective tray assembly between a stacked position and an extended position. In use, the lid portion 17 is closable over the base portion 18 when the tray assemblies 19a,19b are in the stacked positions.

The top 11 of the tackle box 10 has a carrying handle 20 pivotally coupled thereto. Preferably, the top 11 of the tackle box 10 has a generally rectangular handle depression 21 centrally located on the top 11 of the tackle box 10. The carrying handle 20 is located in the rectangular handle depression 21 of the top 11 of the tackle box 10. The top 11 of the tackle box 10 also has a pair of generally circular depressions 22,23. Each of the circular depressions 22,23 of the top 11 of the tackle box 10 is designed for receiving a bottom of a beverage container therein. The circular depressions 22,23 of the top 11 of the tackle box 10 are located towards the first end 13 of the tackle box 10.

The top 11 of the tackle box 10 has spaced apart first and second top clips 24,25 upwardly extending therefrom. The first and second top clips 24,25 are designed for holding a flashlight 28 to the top 11 of the tackle box 10. Each of the top clips 24,25 has a pair of opposing arms 26,27. The arms 26,27 of each top clip 24,25 are biased towards one another. The pair of arms 26,27 of each top clip 24,25 is designed for receiving a flashlight 28 therebetween such that the flashlight 28 is held between held between the pair of arms by the biasing force of the arms. Preferably, the top 11 of the tackle box 10 has a generally rectangular depression 29. The rectangular depression 29 of the top 11 of the tackle box 10 is located adjacent the second end 14 of the tackle box 10 such that the handle depression 21 is interposed between the rectangular depression 29 and the circular depressions 22,23. The rectangular depression 29 is ideally generally located on the top 11 of the tackle box 10 at a midpoint between front and back sides 15,16 of the tackle box 10. The rectangular depression 29 is positioned between the pair of arms 26,27 of each of the top clips 24,25 such that the flashlight 28 held between the arms of the top clips 24,25 rests in the rectangular depression 29. The handle depression 21 and the rectangular depression 29 each have a pair of spaced apart parallel side walls 30a,30b,31a,31b. The side walls 30a,30b,31a,31b of the handle depression 21 and the rectangular depression 29 extend generally parallel to one another and generally parallel to the front and back sides 15,16 of the tackle box 10.

Preferably, the top 11 of the tackle box 10 has an upwardly extending raised portion 32. The depressions 21,22,23,29 of the top 11 of the tackle box 10 are located in the raised portion 32 of the top 11 of the tackle box 10. The raised portion 32 is generally rectangular in configuration and has a pair of end edges 33 and a pair of side edges 34. The end edges 33 of the raised portion 32 extend generally parallel to one another and to the ends 13,14 of the tackle box 10. The side edges 34 of the raised portion 32 extend generally parallel to one another and to the sides of the tackle box 10. The side edges 34 of the raised portion 32 are ideally rounded to prevent injury to a user, especially to protect the knuckles of the user from abrasions when trying to grasp the carrying handle 20.

The lid and base portions 17,18 of the tackle box 10 each have a pair of side clips 35,36,37,38 on the front side 15 of the tackle box 10. Ideally, as illustrated in FIGS. 2 and 3, the lid and base portions each also have a pair of side clips of the back side of the tackle box. Each pair of side clips 35,36,37,38 are designed for holding a fishing rod 41 to the front side 15 of the tackle box 10. Ideally, each pair of side clips 35,36,37,38 is designed for holding a pair of portions of a collapsed shaft of the fishing rod 41. Each of the side clips 35,36,37,38 has a pair of opposing arms 39,40 towards one another. The arms of each side clip 35,36,37,38 are designed for receiving a fishing rod 41 therebetween to hold the fishing rod 41 therebetween. One of the side clips 35,37 of the lid portion 17 and the base portion 18 is positioned towards the first end 13 of the tackle box 10. Another of the side clips 36,38 of the lid portion 17 and the base portion 18 is positioned towards the second end 14 of the tackle box 10. The pair of side clips 35,36 of the lid portion 17 preferably generally lie along a line generally parallel with respect to the top 11 of the tackle box 10. Similarly, the pair of side clips 37,38 of the base portion 17 preferably generally lie along a line generally parallel with respect to the top 11 of the tackle box 10.

In use, the tackle box lets a user carry of their fishing supplies with a single hand. The user's fishing rods attach to the tackle box so that the user does not have to hold their fishing rods with another of their hands. The flashlight on the tackle box lets the user see the area in front of the user while carrying the tackle box. The tackle box is especially useful during low light conditions in rugged terrain so that the user has a hand free to grasp items to help keep the user stable and upright and so that the user can see any potential obstacles in the terrain.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A fishing accessory, comprising:
    a tackle box having a top, a bottom, first and second ends, and front and back sides;
    said tackle box having separable lid and base portions, said lid and base portions of said tackle box being pivotally coupled together at said back side of said tackle box;
    said top of said tackle box having a carrying handle being pivotally coupled thereto;
    said top of said tackle box having a pair of generally circular depressions, each of said circular depressions of said top of said tackle box being adapted for receiving a bottom of a beverage container therein;
    said top of said tackle box having spaced apart first and second top clips upwardly extending therefrom, said first and second top clips being adapted for holding a flashlight to said top of said tackle box; and
    said lid and base portions of said tackle box each having a pair of side clips on said front side of said tackle box, each pair of side clips being adapted for holding a fishing rod to said front side of said tackle box.

2. The fishing accessory of claim 1, wherein said tackle box has a latch on said front side of said tackle box releasably coupling said lid and base portions together, and wherein said tackle box has a pair of tray assemblies therein.

3. The fishing accessory of claim 1, wherein said top of said tackle box has a generally rectangular handle depression centrally located on said top of said tackle box, said carrying handle being located in said rectangular handle depression of said top of said tackle box.

4. The fishing accessory of claim 1, wherein said circular depressions of said top of said tackle box are located towards a first of said ends of said tackle box.

5. The fishing accessory of claim 1, wherein each of said top clips has a pair of arms, said arms of each top clip being biased towards one another, said pair of arms of each top clip being adapted for receiving a flashlight therebetween such that the flashlight is held between held between said pair of arms.

6. The fishing accessory of claim 5, wherein said top of said tackle box has a generally rectangular depression, said rectangular depression of said top of said tackle box being located adjacent a second of said ends of said tackle box, said rectangular depression being positioned between said pair of arms of each of said top clips such that the flashlight held between said arms of said top clips rests in said rectangular depression.

7. The fishing accessory of claim 1, wherein said top of said tackle box has an upwardly extending raised portion, said depressions of said top of said tackle box being located in said raised portion of said top of said tackle box.

8. The fishing accessory of claim 1, further comprising a flashlight, said top clips holding said flashlight to said top of said tackle box.

9. The fishing accessory of claim 1, wherein each pair of side clips holds a fishing rod to said front of said tackle box.

10. A fishing accessory, comprising:
    a tackle box having a top, a bottom, first and second ends, and front and back sides;
    said tackle box having separable lid and base portions, said lid and base portions of said tackle box being pivotally coupled together at said back side of said tackle box;
    said tackle box having a latch on said front side of said tackle box releasably coupling said lid and base portions together;
    said lid portion of said tackle box including said top of said tackle box, said base portion including said bottom of said tackle box, said lid and base portions each having a portion of each of said ends and said sides of said tackle box;
    said tackle box having a pair of tray assemblies therein;
    said top of said tackle box having a carrying handle being pivotally coupled thereto, said top of said tackle box having a generally rectangular depression centrally located on said top of said tackle box, said carrying handle being located in said rectangular handle depression of said top of said tackle box;

said top of said tackle box having a pair of generally circular depressions, each of said circular depressions of said top of said tackle box being adapted for receiving a bottom of a beverage container therein, said circular depressions of said top of said tackle box being located towards a first of said ends of said tackle box;

said top of said tackle box having spaced apart first and second top clips upwardly extending therefrom, said first and second top clips being adapted for holding a flashlight to said top of said tackle box;

each of said top clips having a pair of arms, said arms of each top clip being biased towards one another, said pair of arms of each top clip being adapted for receiving a flashlight therebetween such that the flashlight is held between held between said pair of arms;

said top of said tackle box having a generally rectangular depression, said rectangular depression of said top of said tackle box being located adjacent a second of said ends of said tackle box such that said handle depression is interposed between said rectangular depression and said circular depressions;

said rectangular depression being generally located on said top of said tackle box at a midpoint between front and back sides of said tackle box;

said rectangular depression being positioned between said pair of arms of each of said top clips such that the flashlight held between said arms of said top clips rests in said rectangular depression;

said handle depression and said rectangular depression each having a pair of spaced apart side walls, said side walls of said handle depression and said rectangular depression extending generally parallel to one another and generally parallel to said front and back sides of said tackle box;

said top of said tackle box having an upwardly extending raised portion, said depressions of said top of said tackle box being located in said raised portion of said top of said tackle box;

said raised portion being generally rectangular in configuration and having a pair of end edges and a pair of side edges, said end edges of said raised portion extending generally parallel to one another and to said ends of said tackle box, said side edges of said raised portion extending generally parallel to one another and to said sides of said tackle box, said side edges of said raised portion being rounded;

said lid and base portions of said tackle box each having a pair of side clips on said front side of said tackle box, each pair of side clips being adapted for holding a fishing rod to said front side of said tackle box;

each of said side clips having a pair of arms biased towards one another, said arms of each side clip being adapted for receiving a fishing rod therebetween to hold the fishing rod therebetween;

one of said side clips of said lid portion and said base portion being positioned towards said first end of said tackle box, another of said side clips of said lid portion and said base portion being positioned towards said second end of said tackle box;

said pair of side clips of said lid portion generally lying along a line generally parallel with respect to said top of said tackle box; and said pair of side clips of said lid portion generally lying along a line generally parallel with respect to said top of said tackle box.

\* \* \* \* \*